United States Patent Office 2,846,406
Patented Aug. 5, 1958

2,846,406

PROCESS FOR THE PRODUCTION OF POLYMERIC AMINES AND AMMONIUM SALTS FROM OLEFIN-CARBON MONOXIDE POLYMERS

Helmut Kleiner, Opladen, Otto Bayer, Leverkusen-Bayerwerk, and Hugo Wilms, Leverkusen, Germany, assignors to Farbenfabriken Bayer Aktiengesellschaft, Leverkusen, Germany, a corporation of Germany No Drawing. Application May 6, 1955
Serial No. 506,669

Claims priority, application Germany May 15, 1954

13 Claims. (Cl. 260—2.1)

The present invention relates to a process for the production of polymeric amines and ammonium salts.

According to United States Patent No. 2,495,255, polyamines of relatively high molecular weight can be obtained from monoolefine-carbon monoxide copolymers by the reductive amination of the said copolymers. When this process is used it is necessary to work at comparatively high pressures and in closed vessels.

It is an object of this invention to provide a simple and efficient process for the production of polyamines of high molecular weight from mono-olefine carbon monoxide copolymers.

Another object of this invention is to provide new and useful high molecular weight polyamines from mono-olefine carbon monoxide copolymers.

Further objects will become apparent as the following description proceeds.

It has now surprisingly been found that polyamines of relatively high molecular weight can be obtained from mono-olefine carbon monoxide copolymers in a simple manner, without the use of high pressures and catalysts, by reacting the polymers with formaldehyde and ammonium salts or amine salts which carry at least one N-bonded H atom, and if desired quaternizing the polyamines obtained.

As can be seen from the structural Formulae I, II or III, the bases may react once, twice or three times with formaldehyde and the methylene groups which are adjacent to the CO groups, depending on whether the said bases carry one, two or three hydrogen atoms on the nitrogen atom.

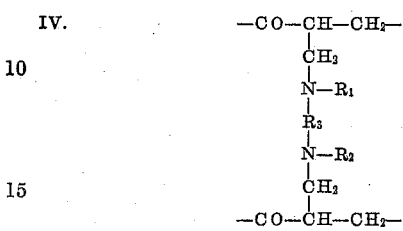

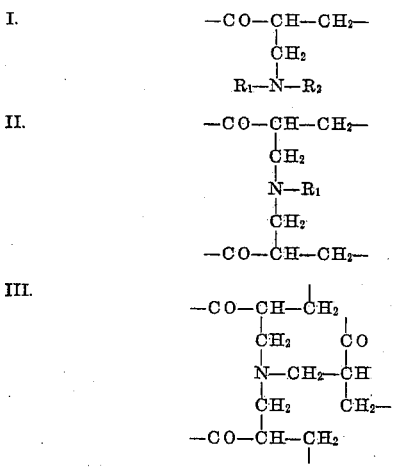

Consequently, Formula I applies as regards secondary amines and Formula II as regards primary amines, while Formula III illustrates the method of reaction of ammonia. Therefore, by suitable choice of the bases, it is possible to obtain soluble or cross-linked and insoluble products; however, it is also possible to obtain soluble reaction products from ammonia or primary amines by maintaining special experimental conditions, for example by using the bases in excess or by working with bases in a relatively highly diluted form. Under these conditions, soluble reaction products can also be obtained from polyamines, whereas cross-linking as shown in Formula IV occurs if these precautions are not taken.

IV.
$$\begin{array}{c}-CO-CH-CH_2-\\ |\\ CH_2\\ |\\ N-R_1\\ |\\ R_3\\ |\\ N-R_2\\ |\\ CH_2\\ |\\ -CO-CH-CH_2-\end{array}$$

$R_1$ and $R_2$ represent hydrogen atoms or aliphatic, araliphatic, cycloaliphatic or heterocyclic radicals. $R_3$ represents an aliphatic, araliphatic, cycloaliphatic, or heterocyclic radical.

The reaction is generally carried out by mixing the dissolved or dispersed polymer with an amount of amine salt which corresponds stoichiometrically to the carbonyl groups in the polymer, or with an even larger amount of amine salt, and with the same amount or twice the amount of formaldehyde, and the mixture is heated until a sample has become water-soluble or even, when a polyfunctional base has been used, until complete cross-linking has occurred, with gelling of the mixture.

If the polymers are dissolved in organic solvents, it is desirable to use the polymeric modifications of formaldehyde, for example paraformaldehyde, instead of monomeric formaldehyde itself.

Alcohols, hydrocarbons or cyclic ethers, such as tetrahydrofurane or dioxane, are primarily suitable as organic solvents. Solvents which, like acetone, are themselves able to participate in the reaction are less suitable. Instead of using ready-prepared amine salts it is also possible for these to be formed in the mixture itself from the free bases and the acid.

Among the large number of bases which are suitable for the reaction, it is possible to mention the following: ammonia, methylamine, ethylamine, propylamine, butylamine-, β-hydroxyethylamine, β-chloroethylamine, allylamine, benzylamine, β-phenylethylamine, β-acetoxyethylamine, ω-aminoacetophenone, ethylene diamine, as. dimethyl-ethylene diamine, propylene diamine, as. dimethyl-propylene diamine, dimethylamine, diethylamine, diethanolamine, dipropylamine, dibutylamine, diisoamylamine, dibenzylamine, methyl-diethyl ethylene diamine, piperidine, morpholine and piperazine.

Heterocyclic amines, such as piperidine or morpholine, react particularly readily.

Reaction products which are not cross-linked readily dissolve in the form of their salts in water, as free bases in alcohols, hydrocarbons or cyclic ethers, such as tetrahydrofurane or dioxane. The free bases have a tendency to become cross-linked spontaneously, particularly when they are heated to relatively high temperatures. In certain cases, however, salts of the polybases also tend to become cross-linked spontaneously when they are formed by drying aqueous solutions, for example the reaction products obtained from diethanolamine or morpholine.

Both inorganic and organic acids are acids suitable for the dissolution.

The nitrogen content of the reaction products depends on the content of CO groups in the original polymers, and is obviously also dependent on the reaction time. If a high proportion of CO-groups is present in the reaction products their nitrogen content is simultaneously high. The reaction time may vary within the range of between 30 minutes to 10 hours, and depends on the content of CO-groups in the original polymers. In general the reaction is carried out within 2 to 4 hours at temperatures of between 50 to 150° C., preferably at about the boiling temperatures of the reaction mixture. It is to be understood, however, that higher or lower temperatures may be applied under certain conditions. Generally it is sufficient for the reaction mixture to be heated for some hours in the region of 100° C. in order to produce satisfactory reaction.

The polyamines obtained can be quaternised in the conventional manner with dimethyl sulphate or with compounds which have reactive halogen atoms.

The copolymers can be prepared as disclosed in German Patent No. 863,711 and United States Patent No. 2,495,286. In order to be able to obtain products with a relatively high nitrogen content it is desirable to arrange for the content of carbonyl groups in the copolymer to be as high as possible. It is desirable to have carbonyl contents of about 30% up to 50%, which is the maximum value which can be obtained. Mixtures of monoolefines, for example mixtures of ethylene and propylene, can be used for the polymerisation with carbon monoxide.

The reaction products produced by the process of the present invention can be used for the production of coatings on various supports, as plasticisers, as textile auxiliaries, for example as levelling agents or animalising agents, for improving the water-fastness of substantive dyes, and also as a binder for pigments, for improving paper and leather, or even as anion exchangers.

The present invention is further illustrated by the following examples without being restricted thereto.

Example 1

88 parts by weight of an ethylene-carbon monoxide copolymer containing 32% = 1 mol, of carbon monoxide are dissolved in 600 parts by weight of hot butanol, and heated for one hour under reflux after adding 121.5 parts by weight of piperidine hydrochloride (1 mol), 45 parts by weight of paraformaldehyde (1.5 mols) and 2.5 parts by volume of hydrochloric acid (about 40%). After adding 30 g. of paraformaldehyde (1 mol), the heating process is continued for approximately two more hours. Upon cooling, the precipitated dark-coloured oily reaction product is separated, washed with ether and dried in vacuo. 220 parts by weight of a brittle, yellowish-brown mass, which dissolves readily in water, are obtained.

The N-content calculated on the CO content is 6.8%, while analysis showed 5.8%. The calculated value for Cl was 17.3%, while the amount found was 15.0%.

The free base obtainable from this product by treatment with alkalis is a very viscous mass which is insoluble in water. It is soluble in alcohols, hydrocarbons or cyclic ethers, such as tetrahydrofurane or dioxane. It can be converted into an insoluble cross-linked condition by being heated to a temperature in the region of 120–130° C.

Example 2

46 parts by weight (0.5 mol of CO) of a copolymer of equal parts of ethylene and propylene with carbon monoxide (30% CO) are dissolved in 300 parts by weight of butanol and heated to boiling point with 41 parts by weight of dimethylamine hydrochloride (0.5 mol), 22.5 parts by weight of paraformaldehyde and 1.5 parts by volume of 40% hydrochloric acid.

After boiling for half an hour, a sample indicates that the product is soluble in water. The solvent is now distilled off in vacuo and the residue treated with ether in order to remove residual solvent. A dried sample showed a nitrogen content of 3.3% (calculated: 6.25%). This shows that 52.5% of the active methylene groups adjacent to the carbonyl groups have reacted.

Example 3

The polyamine obtained as described in Example 2 is liberated by excess sodium hydroxide from an aqueous solution of its hydrochloride, and the precipitated base is washed with water and dissolved in 300 parts by volume of tetrahydrofurane. 70 parts by weight of dimethyl sulphate are then added. 16 parts by weight of sodium hydroxide, dissolved in 80 parts by volume of water, are then slowly added dropwise and while stirring to the solution, which has been heated to 30° C. until the alkaline reaction is maintained. The product is mixed with 700 parts by volume of water, and the quaternisation product which is precipitated is washed several times with a small amount of water, then dissolved in about 1000 parts by volume of water and concentrated to the limit of solubility. An approximately 7–10% yellowish slightly opalescent solution is obtained. The nitrogen value of the dry substance was 2.24%, the sulphur value 5.2%, i. e. there is one sulphur atom to one nitrogen atom.

The quaternary base can be dried at 20° C. or at 50° C.; at 100° C., however, it is converted into a cross-linked condition. If the aqueous solution of the quaternary base is mixed with hydrochloric acid, the sparingly soluble chloride precipitates, but, in contrast to the hydrochloride, no precipitation takes place with caustic soda solution.

Example 4

46 parts by weight (½ mol of CO) of a copolymer of ethylene-propylene-carbon monoxide containing 30% of CO, are dissolved in
300 parts by weight of butanol, and
100 parts by weight of tetrahydrofurane. This solution is added dropwise to a solution of
150 parts by weight of ammonium acetate (1.1 mol),
30 parts by weight of paraformaldehyde (1 mol),
25 parts by weight of glacial acetic acid, in
500 parts of butanol.

The mixture thus obtained is then boiled for a further 3 hours, about two-thirds of the solvent is distilled off and the reaction product is precipitated with ether. It is then covered with a small amount of water to remove unused ammonium acetate, the water is decanted off and the reaction product then dissolved in water. A clear reddish-brown solution is obtained.

In the dry state, the acetate of the polybase is a reddish-brown powder. The free base has an N-content of 10.1% (calculated 10.07%). It very readily tends to cross-link spontaneously.

Example 5

9.3 parts by weight (1 mol of CO) of a copolymer of ethylene-propylene-carbon monoxide containing 30% of CO are dissolved while hot in
60 parts by weight of butanol, and mixed with
3.5 parts by weight of paraformaldehyde (1.17 mol),
10 parts by weight of ammonium chloride (2 mols), and
1 part by weight of hydrochloric acid (40%).

After the mixture has been boiled for several hours, the reaction product precipitates in the form of a dark-coloured brittle cross-linked resin.

Example 6

23.5 parts by weight (0.25 mol) of a copolymer of ethylene-propylene-carbon monoxide (30% of CO), dissolved in
150 parts by weight of butanol and
50 parts by weight of tetrahydrofurane are added dropwise to a boiling solution of
28 parts by weight (0.275 mol) of as. dimethylpropylene diamine,
60 parts by weight of glacial acetic acid (1 mol) and
15 parts by weight of paraformaldehyde (0.5 mol) in
250 parts by weight of butanol.

The mixture which is formed is kept at boiling point for approximately three more hours, and thereafter the butanol is separated by steam distillation. A clear slightly yellowish solution of the resulting polyamine acetate is left; this product probably has the following schematic composition:

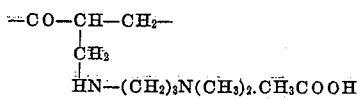

The free base is precipitated by the action of alkalies, for example by ammonia. It is a soft amorphous mass, which when dried in vacuo gels even at a moderate temperature.

*Example 7*

46.0 parts by weight (0.5 mol of CO) of a copolymer of ethylene-propylene-carbon monoxide (30% of CO), are dissolved while hot in
300 parts by weight of butanol, and mixed with
37.5 parts by weight of paraformaldehyde (1.28 mol),
1.5 parts by weight of 40% hydrochloric acid, and
92.0 parts by weight of the hydrochloride of as. dimethylpropylene diamine (0.53 mol).

After this mixture has been boiled for several hours, the reaction product precipitates out in gel form. It is washed with alcohol and water. It is not soluble either in acids or in organic solvents. Analysis indicates the following structure:

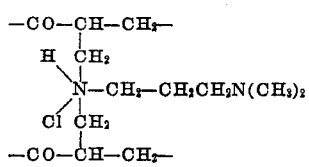

N (calc.) 8.1%; (found) 7.9%. Cl (calc.) 18.3%; (found) 18.1%.

*Example 8.*—Quaternisation of the polyamine described in Example 6.

The reaction product obtained as described in Example 6 is precipitated from the aqueous solution by adding ammonia after the butanol has been driven off and the product is washed with water, to remove unused dimethylpropylene diamine, and is dissolved in 250 parts by volume of tetrahydrofurane and 250 parts by volume of water. 130 parts by weight of dimethyl sulphate and simultaneously caustic soda solution are added dropwise at 30° C. while stirring well, so that the reaction mixture always remains alkaline, approximatley at a pH value of 8. After 10 hours the mixture is diluted with an equal volume of water and saturated common salt solution is added until the reaction product has precipitated out as a soft yellowish-brown mass. It is thoroughly kneaded several times with water and then dissolved in water to give an approximately 5% solution.

We claim:

1. Process for the production of polyamine polymers which comprises contacting at elevated temperature at least about 50° C., (a) monoolefine-carbon monoxide copolymers having a carbonyl content between about 30% and 50%, with at least the stoichiometrical amount, referred to the carbonyl groups of the polymer, of (b) formaldehyde and (c) salts of a compound selected from the group consisting of ammonia, primary amines and secondary amines.

2. Process for the production of polyamine polymers which comprises contacting at elevated temperature at least about 50° C. (a) monoolefine-carbon monoxide copolymers having a carbonyl content between about 30% and 50%, with at least the stoichiometrical amount, referred to the carbonyl groups of the polymer, of (b) formaldehyde and (c) salts of a compound selected from the group consisting of ammonia, primary amines and secondary amines and quaternizing the resultant polymer.

3. Process for the production of polyamine polymers which comprises contacting at temperatures of between about 50 and 150° C., (a) monoolefine-carbon monoxide copolymers having a carbonyl content between about 30% and 50%, with at least the stoichiometrical amount, referred to the carbonyl groups of the polymer, of (b) formaldehyde and (c) salts of a compound selected from the group consisting of ammonia, primary amines and secondary amines.

4. Process for the production of polyamine polymers which comprises contacting at temperatures of between about 50 and 150° C., (a) monoolefine-carbon monoxide copolymers having a carbonyl content between about 30% and 50%, with at least the stoichiometrical amount, referred to the carbonyl groups of the polymer, of (b) formaldehyde and (c) salts of a compound selected from the group consisting of ammonia, primary amines and secondary amines, and quaternizing the resultant polymer.

5. Process for the production of polyamine polymers which comprises contacting at temperatures of about 100° C., (a) monoolefine-carbon monoxide copolymers having a carbonyl content between about 30% and 50%, with at least the stoichiometrical amount, referred to the carbonyl groups of the polymer, of (b) formaldehyde and (c) salts of a compound selected from the group consisting of ammonia, primary amines and secondary amines.

6. Process for the production of polyamine polymers which comprises contacting at temperatures of about 100° C., (a) monoolefine-carbon monoxide copolymers having a carbonyl content between about 30% and 50%, with at least the stoichiometrical amount, referred to the carbonyl groups of the polymer, of (b) formaldehyde and (c) salts of a compound selected from the group consisting of ammonia, primary amines and secondary amines, and quaternizing the resultant polymer.

7. Polyamine polymers obtained by contacting at elevated temperature at least about 50° C., (a) monoolefine-carbon monoxide copolymers having a carbonyl content between about 30% and 50%, with at least the stoichiometrical amount, referred to the carbonyl groups of the polymer, of (b) formaldehyde and (c) salts of a compound selected from the group consisting of ammonia, primary amines and secondary amines.

8. Polyamine polymers obtained by contacting at elevated temperature at least about 50° C., (a) monoolefine-carbon monoxide copolymers having a carbonyl content between about 30% and 50%, with at least the stoichiometrical amount, referred to the carbonyl groups of the polymer, of (b) formaldehyde and (c) salts of a compound selected from the group consisting of ammonia, primary amines and secondary amines, and quaternizing the resultant polymer.

9. Polyamine polymers obtained by contacting at temperatures of between about 50 and 150° C., (a) monoolefine-carbon monoxide copolymers having a carbonyl content between about 30% and 50%, with at least the stoichiometrical amount, referred to the carbonyl groups of the polymer, of (b) formaldehyde and (c) salts of a compound selected from the group consisting of ammonia, primary amines and secondary amines.

10. Polyamine polymers obtained by contacting at temperatures of between about 50 and 150° C., (a) monoolefine-carbon monoxide copolymers having a carbonyl content between about 30% and 50%, with at least the stoichiometrical amount, referred to the carbonyl groups of the polymer, of (b) formaldehyde and (c) salts of a compound selected from the group consisting of ammonia, primary amines and secondary amines, and quaternizing the resultant polymer.

11. Polyamine polymers obtained by contacting at temperatures of about 100° C., (a) monolefine-carbon monoxide copolymers having a carbonyl content between about 30% and 50%, with at least the stoichiometrical amount, referred to the carbonyl groups of the polymer, of (b) formaldehyde and (c) salts of a compound selected from the group consisting of ammonia, primary amines and secondary amines.

12. Polyamine polymers obtained by contacting at temperatures of about 100° C., (a) monoolefine-carbon monoxide copolymers having a carbonyl content between about 30% and 50%, with at least the stoichiometrical amount, referred to the carbonyl groups of the polymer, of (b) formaldehyde and (c) salts of a compound selected from the group consisting of ammonia, primary amines and secondary amines, and quaternizing the resultant polymer.

13. Process for the production of polyamine polymers which comprises contacting at elevated temperature at least about 50° C., (a) monoolefine-carbon monoxide copolymers having a carbonyl content between about 30% and 50%, with at least the stoichiometrical amount, referred to the carbonyl groups of the polymer, of (b) formaldehyde and (c) salts of a compound selected from the group consisting of ammonia, primary amines and secondary amines and quaternizing the reaction products by contact with dimethyl sulfate.

References Cited in the file of this patent

UNITED STATES PATENTS

| 2,495,255 | Hoehn | Jan. 24, 1950 |
| 2,495,286 | Brubaker | Jan. 24, 1950 |
| 2,526,638 | Cupery | Oct. 24, 1950 |

FOREIGN PATENTS

| 456,021 | Canada | Apr. 19, 1949 |

OTHER REFERENCES

Adams et al.: "Organic Reaction," vol. 1, pages 304–307, Wiley and Sons, Publishers, New York (1942). (Copy in Sci. Libr.)